(12) United States Patent
Rowell (10) Patent No.: US 10,569,708 B2
(45) Date of Patent: Feb. 25, 2020

(54) VEHICLES OUTPUTTING CONTEXT DEPENDENT WARNINGS AND ALERTS

(71) Applicant: Toyota Research Institute, Inc., Los Altos, CA (US)

(72) Inventor: Todd J. Rowell, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 180 days.

(21) Appl. No.: 15/624,431

(22) Filed: Jun. 15, 2017

(65) Prior Publication Data

US 2018/0361925 A1 Dec. 20, 2018

(51) Int. Cl.
| | | |
|---|---|---|
| *B60Q 5/00* | (2006.01) | |
| *B60K 35/00* | (2006.01) | |
| *B60Q 9/00* | (2006.01) | |
| *B60W 50/14* | (2020.01) | |
| *B60Q 1/26* | (2006.01) | |
| *B60Q 1/52* | (2006.01) | |

(52) U.S. Cl.
CPC ............. *B60Q 5/006* (2013.01); *B60K 35/00* (2013.01); *B60Q 1/2603* (2013.01); *B60Q 1/525* (2013.01); *B60Q 5/00* (2013.01); *B60Q 9/00* (2013.01); *B60W 50/14* (2013.01); *B60K 2370/178* (2019.05); *B60Q 2300/054* (2013.01)

(58) Field of Classification Search
CPC ...... B60Q 5/006; B60Q 1/2603; B60Q 1/525; B60Q 5/00; B60Q 9/00; B60Q 2300/054; G01C 21/3626; G01C 21/3697; G01C 21/34; G06T 7/11; B60W 20/13; B60W 50/14; H04M 1/72577; B60K 35/00; B60K 2370/178

See application file for complete search history.

(56) References Cited

U.S. PATENT DOCUMENTS

| | | | |
|---|---|---|---|
| 7,233,233 B2 | 6/2007 | Taniguchi et al. | |
| 7,497,285 B1 * | 3/2009 | Radev | B60W 20/13 180/65.225 |
| 7,649,444 B1 | 1/2010 | Fear et al. | |
| 7,916,039 B2 | 3/2011 | Hess et al. | |
| 9,141,583 B2 | 9/2015 | Prakah-Asante et al. | |
| 9,146,898 B2 | 9/2015 | Ihlenburg et al. | |
| 9,175,967 B2 * | 11/2015 | Abramson | G01C 21/3697 |

(Continued)

FOREIGN PATENT DOCUMENTS

DE 102013202602 A1 8/2014

OTHER PUBLICATIONS

Shrestha et al., A classification tree-based system for multi-sensor train approach detection, 2015, IEEE, p. 2161-2166 (Year: 2015).*

(Continued)

*Primary Examiner* — McDieunel Marc
(74) *Attorney, Agent, or Firm* — Dinsmore & Shohl LLP (57) ABSTRACT

A vehicle includes an object detection sensor configured to output an output signal, a notification device, and an electronic control unit. The electronic control unit is configured to detect an object based on the output signal of the object detection sensor, classify the detected object into a classification, determine a notification magnitude level based on the classification of the detected object, and output a notification with the notification device at the determined notification magnitude level.

20 Claims, 6 Drawing Sheets

(56) References Cited

U.S. PATENT DOCUMENTS

| | | | |
|---|---|---|---|
| 9,638,537 B2* | 5/2017 | Abramson | G01C 21/3626 |
| 9,772,196 B2* | 9/2017 | Abramson | G01C 21/34 |
| 2006/0250230 A1 | 11/2006 | Fischer et al. | |
| 2013/0234844 A1 | 9/2013 | Yopp | |
| 2017/0279957 A1* | 9/2017 | Abramson et al. | H04M 1/72577 |
| 2018/0322342 A1* | 11/2018 | Clifford | G06T 7/11 |

OTHER PUBLICATIONS

Kern et al., Context-aware notification for wearable computing, 2003, IEEE, p. 1-8 (Year: 2003).*

Khalaf et al., Advance flood detection and notification system based on sensor technology and machine learning algorithm, 2015, IEEE, p. 105-108 (Year: 2015).*

Morris et al., Contextual Activity Visualization from Long-Term Video Observations, 2010, IEEE, p. 50-62 (Year: 2010).*

* cited by examiner

VEHICLES OUTPUTTING CONTEXT DEPENDENT WARNINGS AND ALERTS

TECHNICAL FIELD

The present specification generally relates to vehicles capable of producing warnings and alerts and, more specifically, vehicles outputting context dependent warnings and alerts.

BACKGROUND

Vehicles may provide warnings of a variety of conditions, such as activating a light when another vehicle detected in a blind spot. Vehicles may also generate alerts, such as when a vehicle horn is activated. However, such warnings and alerts provided by conventional vehicles are not typically altered or adjusted depending on the environment of the vehicle.

Accordingly, a need exists for alternative vehicles outputting context dependent warnings and alerts.

SUMMARY

In one embodiment, a vehicle includes an object detection sensor configured to output an output signal, a notification device, and an electronic control unit. The electronic control unit is configured to detect an object based on the output signal of the object detection sensor, classify the detected object into a classification, determine a notification magnitude level based on the classification of the detected object, and output a notification with the notification device at the determined notification magnitude level.

In another embodiment, a vehicle includes a location sensor configured to output an output signal, a notification device, and an electronic control unit. The electronic control unit is configured to determine a vehicle location based on the output signal of the location sensor, determine a notification magnitude level based on the determined vehicle location, and output a notification with the notification device at the determined notification magnitude level.

In yet another embodiment, a vehicle includes a sensor configured to output an output signal, a vehicle horn, and an electronic control unit. The electronic control unit is configured to determine, based on the output signal of the sensor, at least one of a classification of a detected object and a vehicle location, and output an audible notification with the vehicle horn at the determined notification magnitude level.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include vehicles configured to output warnings and alerts dependent on an environment of the vehicle. As such, the vehicle may provide context dependent warnings and alerts. Embodiments described herein may use a variety of information (e.g., from sensors and/or location information) to determine characteristics of the environment in which the vehicle operates. Based on this environment information a notification magnitude level of a notification device may be adjusted. For example, a vehicle may be located within a city where pedestrians are situated within a vicinity of the vehicle or, instead, the vehicle may be located on a highway. In each case, characteristics of the alerts or warnings produced by the notification device may be adjusted in response to detecting these environmental factors. As such, warning/alert volumes and tones may be adjusted depending on variations in the vehicle's specific environment. The various vehicle embodiments will be described in more detail herein with specific reference to the corresponding drawings.

Figure 1:
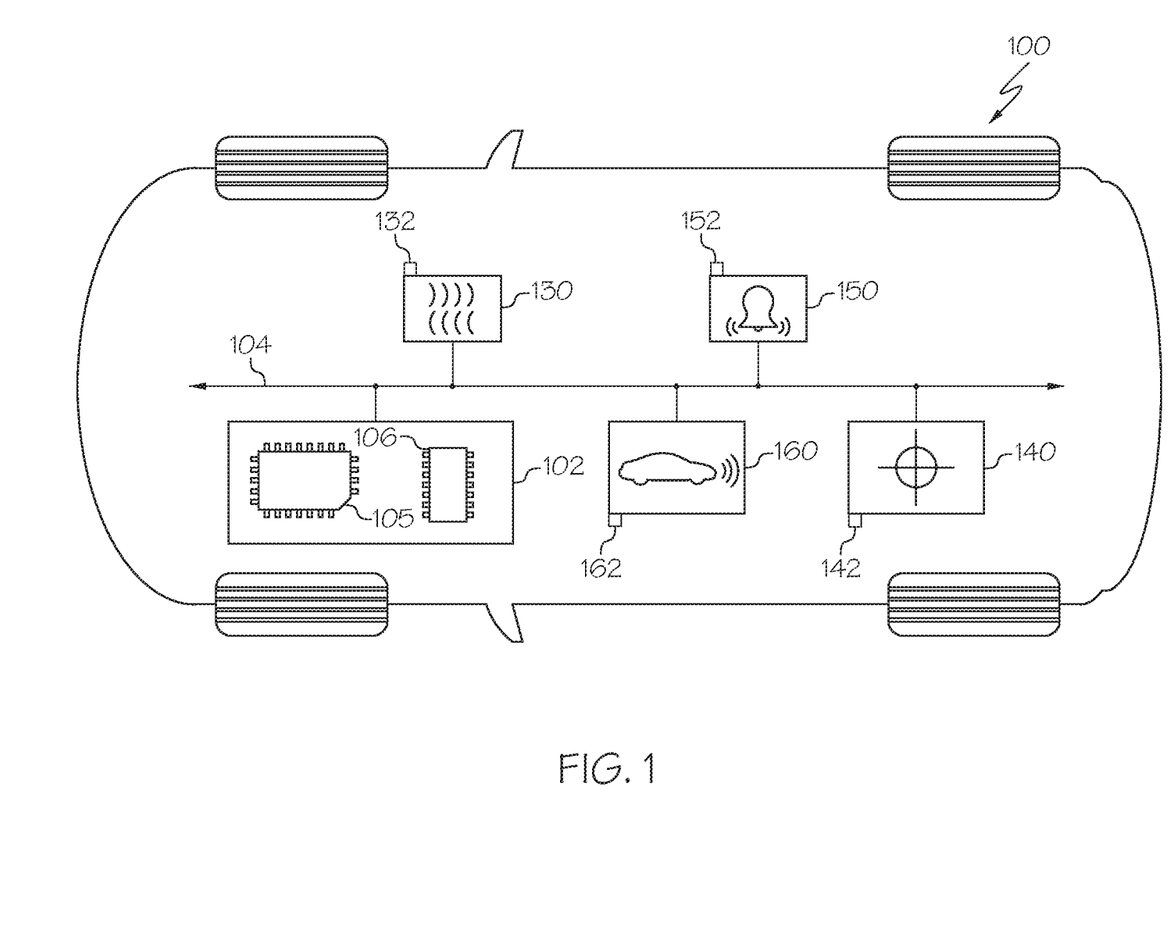
FIG. 1 depicts a schematic view of a vehicle configured to output context dependent alerts and warnings, according to one or more embodiments shown and described herein.

Referring now to FIG. 1, an embodiment of a vehicle 100 is schematically depicted. The vehicle 100 may be any passenger vehicle such as, for example, a terrestrial, aquatic, and/or airborne vehicle. The vehicle 100 includes a communication path 104, electronic control unit 102, an object detection system 130, a notification system 150, a location determination system 140, and a vehicle operating condition sensor system 160. The electronic control unit 102 includes one or more processors 105 and one or more memory modules 106. The electronic control unit 102 is configured to control and adjust the various vehicle warnings and alerts as produced by the notification system 150 based on information received from at least one of the object detection system 130 and the location determination system 140.

The communication path 104 provides data interconnectivity between various modules disposed within the vehicle 100. Specifically, each of the modules can operate as a node that may send and/or receive data. In some embodiments, the communication path 104 includes a conductive material that permits the transmission of electrical data signals to processors, memories, sensors, and actuators throughout the vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 can be any computing device. For instance the electronic control unit 102 can be any type of vehicle-installed, handheld, desktop, or other form of single computing device, or can be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic and logic to permit the electronic control unit 102 to adjust a notification device 152 of the notification system 150 to a determined notification magnitude level, as described below. As such, the electronic control unit 102 may be in direct or indirect communication with the notification system 150 to control various notification devices of the notification system 150.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure.

The object detection system 130 is communicatively coupled to the electronic control unit 102 over the communication path 104. The object detection system 130 may include any device configured to detect the presence of an object within the vicinity of the vehicle 100. As such, the object detection system 130 may include an object detection sensor 132. The object detection sensor 132 may be configured to output an output signal indicative of the presence of one or more objects within a vicinity of the vehicle 100. Based on the output signal of the object detection sensor 132, the electronic control unit 102 may execute object recognition logic to detect an object and classify the detected object into a classification. The object detection sensor 132 may include, but is not limited to, a camera, a LiDAR sensor, a RADAR sensor, a sonar sensor, a proximity sensor, and the like. In some embodiments, the object detection system 130 includes more than one object detection sensor 132.

The location determination system 140 is communicatively coupled to the electronic control unit 102 over the communication path 104. The location determination system 140 may include any device configured to determine a location of the vehicle 100. For example, the location determination system 140 may determine that the vehicle 100 is on a highway, in a city, in a rural area, etc. As such, the location determination system 140 may include a location sensor 142 configured to output an output signal indicative of the location of the vehicle 100. Based on the output signal of the location determination system 140, the electronic control unit 102 may execute logic to determine a vehicle location. The location sensor 142 may include, but is not limited to, a camera, a GPS unit, and the like. In embodiments where the location sensor 142 includes a camera, the electronic control unit 102 may execute object recognition logic to determine based on objects within the environment of the vehicle 100, the location of the vehicle 100. For example, the one or more processors 105 of the electronic control unit 102 may execute object recognition logic, such that the electronic control unit 102 may read signs and/or recognize objects that may indicate a location of the vehicle 100 (e.g., on ramps, highways, sidewalks, storefronts, houses, and the like).

The vehicle operating condition sensor system 160 is communicatively coupled to the electronic control unit 102 over the communication path 104. The vehicle operating condition sensor system 160 may include any device configured to detect an operating condition of the vehicle 100. For example, the vehicle operating condition sensor system 160 may detect vehicle speed, acceleration, braking, and the like. As such, the vehicle operating condition sensor system 160 may include an operation condition sensor 162 configured to output an output signal indicative of the operation of the vehicle 100. The operation condition sensor 162 may include, but is not limited to, a speed sensor, an acceleration sensor, a braking sensor, and the like. In some embodiments, the operation condition sensor 162 may be a GPS unit, wherein a speed of the vehicle 100 is determined from an output of the GPS unit.

In view of the above, the vehicle 100 includes a sensor that outputs a sensor signal. The sensor may include at least one of an object detection sensor 132, a location sensor 142, and an operation condition sensor 162. As will be described in greater detail herein, the sensor signal output by the sensor may allow the electronic control unit 102 to determine a characteristic of the environment of the vehicle 100. Based on the characteristic of the environment, the electronic control unit 102 may determine a notification magnitude level and output a notification with the notification device 152 at the determined notification magnitude level.

The notification system 150 is communicatively coupled to the electronic control unit 102 over the communication path 104. The notification system 150 may include any notification device 152 configured to output a notification (e.g., an alert or warning) to either an occupant of the vehicle 100 or an object detected outside of the vehicle 100. The notification device 152 may include, but is not limited to, a vehicle horn, a vehicle light (e.g., turn signals, headlamps, emergency lights, tail lights, interior lights, etc.), a tactile feedback device, a vehicle speaker, and the like. As will be described in greater detail below, based on outputs signals from the object detection sensor 132, the location sensor 142, and/or the operation condition sensor 162, the electronic control unit 102 may determine a notification magnitude level and output a notification with the notification device 152 at the determined notification magnitude level.

Figure 2:
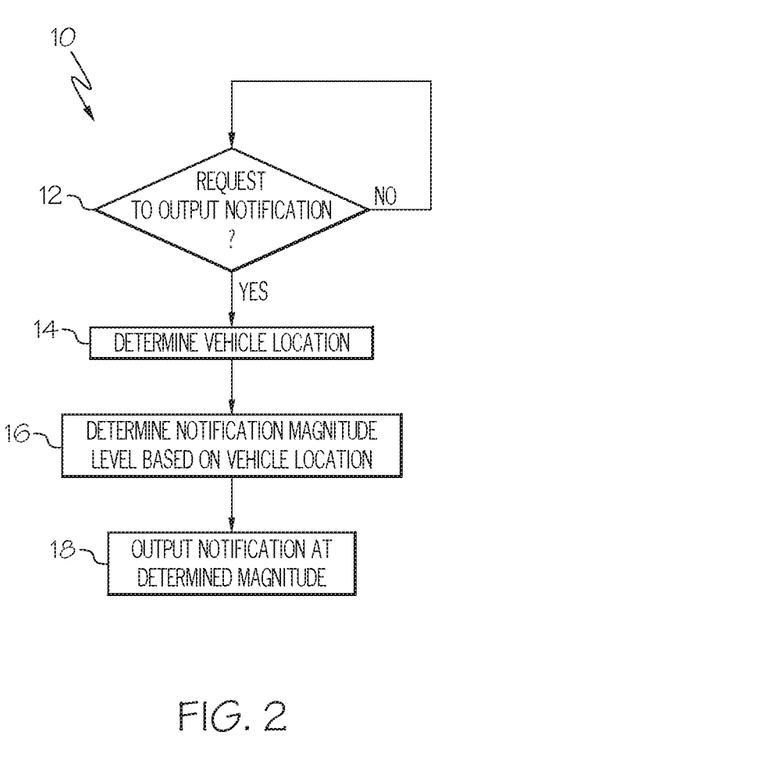
FIG. 2 depicts a method for outputting context dependent alerts and warnings, according to one or more embodiments shown and described herein.

Referring now to FIG. 2, a flowchart 10 for outputting a notification with the notification device 152 at a determined notification magnitude level is generally depicted. To begin, a request to output a notification is received or produced by the electronic control unit 102 (block 12). For example, a vehicle operator pushing on a vehicle horn of the vehicle 100 may be considered a request to output an audible notification. In some embodiments, the request to output a notification may be produced by the electronic control unit 102 or some other system of the vehicle 100, wherein the vehicle 100 automatically produces an alert or warning to either the vehicle operator or to an object outside of the vehicle 100. For example, such automatic notifications may include blind spot warnings, upcoming traffic alerts, and the like. When a request to output a notification is received or produced by the electronic control unit 102, the electronic control unit 102 determines a vehicle location based on the output signal of the location sensor 142 (block 14).

As noted above, the location sensor 142 is configured to output an output signal indicative of the location of the vehicle 100. Based on the vehicle location, as indicated by the output signal of the location sensor 142, the electronic control unit 102 may determine a notification magnitude level (block 16). Different vehicle locations may merit different notification magnitude levels. For example, driving on a city street might merit a notification magnitude level that is lower than a notification magnitude level appropriate for a highway environment. As such, the electronic control unit 102 may output a notification with the notification device 152 at the determined notification magnitude level (block 18) that is appropriate for the vehicle location. As such a notification magnitude level may include several magnitude levels associated with different types of locations. For example, the notification magnitude level may include a first magnitude level when the vehicle location is determined to be a first vehicle location (e.g., a city street/urban vehicle location). The notification magnitude level for a second vehicle location may be a second magnitude level when the vehicle location is determined to be a second vehicle location (e.g., a highway/rural vehicle location). The first magnitude level may be lower than the second magnitude level. For example, the first magnitude level may have a lower intensity (e.g., volume/visual cues) than the second magnitude level.

Figure 3:
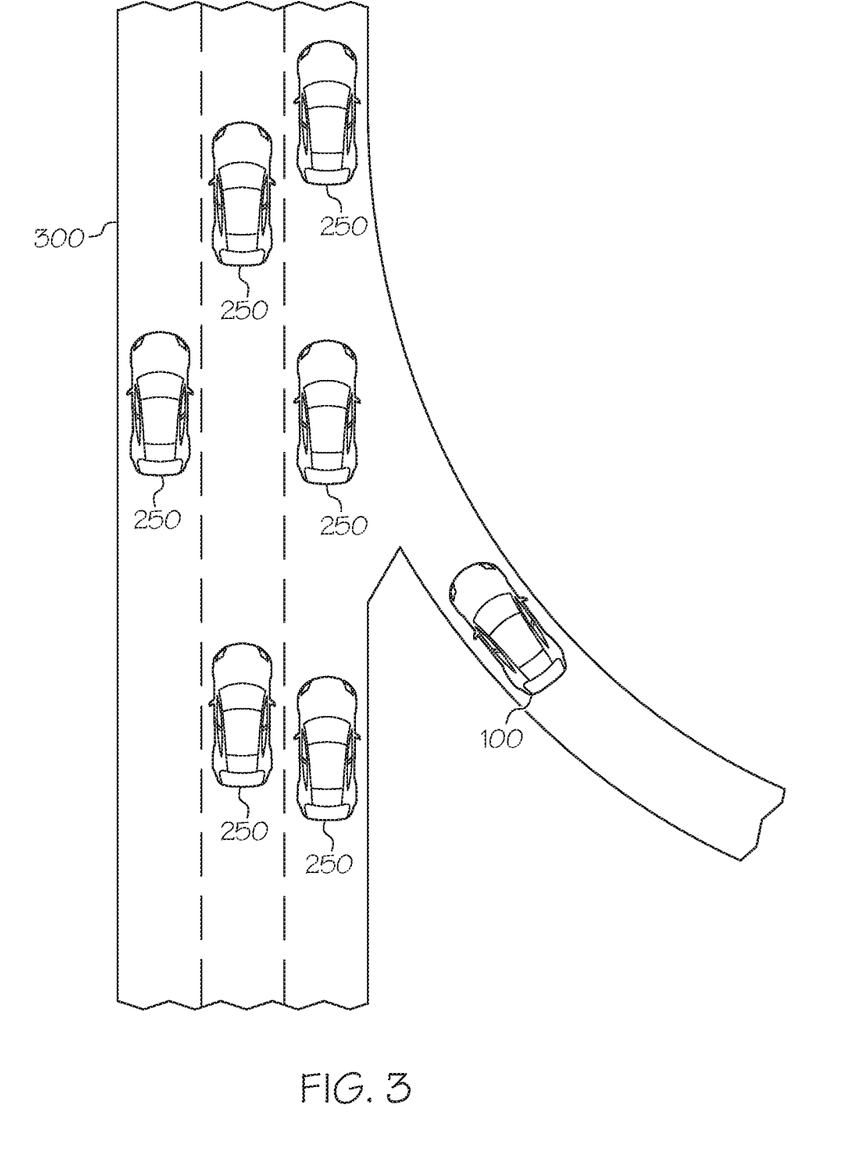
FIG. 3 depicts the vehicle of FIG. 1 on a highway, according to one or more embodiments shown and described herein.

For example, FIG. 3 illustrates the vehicle 100 entering a highway 300. In such an environment, the electronic control unit 102, based on the output signal of the location sensor 142, may determine that the vehicle 100 is located on or is entering a highway 300. For example the location sensor 142 may include a GPS unit to pinpoint the location of the vehicle 100. As noted herein the location sensor 142 may include a camera that may allow the electronic control unit 102 to detect an object within the vicinity of the vehicle 100 and perform object recognition on the detected object to determine a location of the vehicle. In this case, the electronic control unit may perform object recognition to recognize environmental characteristics (e.g., the one ramp, other vehicles, multiple driving lanes, and the like) to determine that the vehicle 100 is on a highway. In either case, based on the determined vehicle location, the electronic control unit may determine a notification magnitude level appropriate for the determined vehicle location. As such, when the electronic control unit 102 outputs a notification with the notification device 152, the output of the notification will be at the determined notification magnitude level. In an environment such as on a highway 300, the determined magnitude level may be enhanced (e.g., louder) as compared to a determined notification in another environment, for example, a city environment. In some embodiments, it may be determined that though the vehicle 100 is on a highway, it is also sitting in traffic. In such a situation, the determined magnitude level may be reduced as compared to a highway environment without much traffic.

Figure 4:
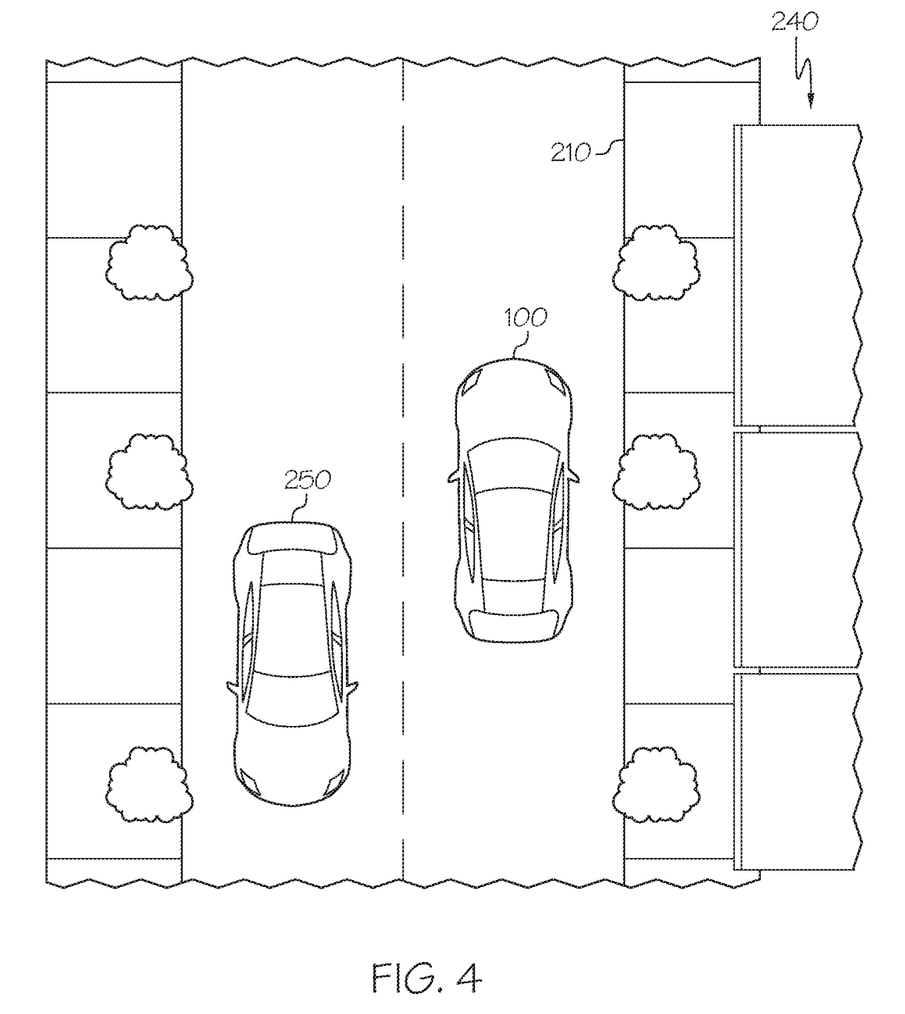
FIG. 4 depicts the vehicle of FIG. 1 on a city street, according to one or more embodiments shown and described herein.

FIG. 4 illustrates the vehicle 100 in a city environment. In such an environment, the electronic control unit 102, based on the output signal of the location sensor 142, may determine that the vehicle 100 is located in an urban environment. For example the location sensor 142 may include a GPS unit to pinpoint the location of the vehicle 100. As noted herein the location sensor 142 may include a camera that may allow the electronic control unit 102 to detect an object within the vicinity of the vehicle 100 and perform object recognition on the detected object to determine a location of the vehicle. In this case, the electronic control unit may perform object recognition to recognize environmental characteristics (e.g., other vehicles, a pedestrian walkway 210, storefronts 240, houses, people, and the like) to determine that the vehicle 100 is in a city. In either case, based on the determined vehicle location, the electronic control unit may determine a notification magnitude level appropriate for the determined vehicle location. In a urban or residential environment such as a city, the notification magnitude level may be determined to be a reduced notification magnitude level. Hence, when a notification is output by a notification device 152, the electronic control unit 102 can output the notification with the notification device 152 at the determined magnitude level.

As noted above, in some embodiments, the electronic control unit 102 may produce the request to output a notification automatically or may determine an appropriate notification type. As such, the electronic control unit 102 may further be configured to determine a notification type based on the determined vehicle location and output the notification of the determined notification type with the notification device. For example, if the electronic control unit 102, as indicated by the output of the location sensor 142, determines the vehicle 100 is in a residential neighborhood the notification chosen may be to flash the vehicle headlamps (i.e., a visual notification) instead of beeping the vehicle horn.

Figure 5:
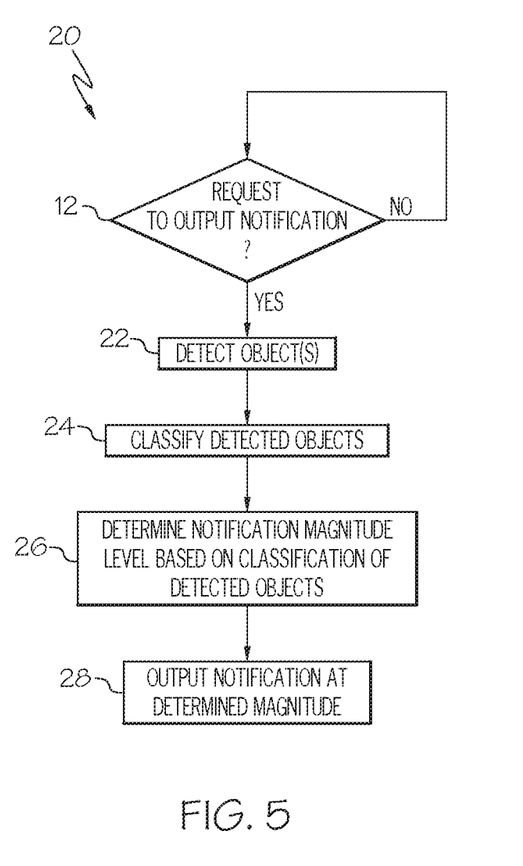
FIG. 5 depicts another method for outputting context dependent alerts and warnings, according to one or more embodiments shown and described herein.

Referring now to FIG. 5, an alternative flowchart 20 for outputting a notification with the notification device 152 at a determined notification magnitude level is generally depicted. It is noted that though flowchart 20 is shown separately from flowchart 10, the various steps included therein may be performed by the same electronic control unit 102. As with flowchart 10, flowchart 20 begins with a request to output a notification received or produced by the electronic control unit 102 (block 12). As noted above, the request to output a notification may be produced manually by a vehicle operator or automatically by the electronic control unit 102. Following the request to output a notification, the electronic control unit 102 may detect an object or objects within a vicinity of the vehicle 100 based on the output signal output by the object detection sensor 132 (block 22).

As noted above, the object detection sensor 132 is configured to output an output signal indicative of the presence of an object within the vicinity of the vehicle 100. Using object recognition logic stored on the one or more memory modules 106, the electronic control unit 102 may then classify the detected objects (block 24). For example, the electronic control unit 102 may classify various objects detected within the vicinity of the vehicle 100 as pedestrians, bicycles, animals, houses, vehicles, skateboards, children's toys, and the like. For example, the electronic control unit 102 may use various object recognition algorithms to detect and classify the various objects found within the environment. Such object recognition algorithms include, for example, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. As noted above, the detected objects may allow the electronic control unit 102 to determine an environment (e.g., residential/commercial) depending on the classifications of objects detected within the environment.

Based on the classification of the detected object, the electronic control unit 102 may determine a notification magnitude level (block 26). Different objects within an environment of the vehicle 100 may indicate to the electronic control unit 102 that the environment merits different notification magnitude levels (e.g. enhanced, regular, or reduced notification magnitude levels). For example, the presence of a pedestrian, a bicyclist, houses, and the like in the vicinity of the vehicle 100 may indicate to the electronic control unit 102 that the vehicle 100 is in an urban or residential setting which may merit lower notification magnitude levels. Conversely where such objects are not detected by the electronic control unit 102, the electronic control unit 102 may determine the vehicle 100 is in a more rural or highway setting which may merit higher notification magnitude levels. As such, a notification magnitude level may include several notification magnitude levels. For example, the notification magnitude level may include a first magnitude level when a classification is a first classification (e.g., a person classification) and a second magnitude level when the classification is a second classification (e.g., a vehicle classification). In such cases, the first magnitude level may be lower than the second magnitude level.

Figure 6:
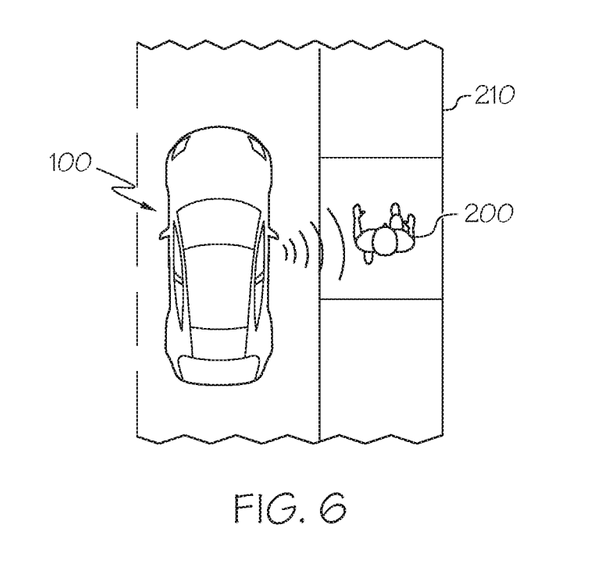
FIG. 6 depicts the vehicle of FIG. 1 within an environment with a pedestrian, according to one or more embodiments shown and described herein.

For example, referring now to FIG. 6, the vehicle 100 is illustrated with a person 200 walking on a pedestrian walkway 210 next to the vehicle 100. In such an environment, the electronic control unit 102, based on the output signal of the object detection sensor 132, may detect an object (e.g., the person 200 and/or the pedestrian walkway 210) within the vicinity of the vehicle 100. The electronic control unit 102 may execute object recognition logic to classify the object. In this case, the electronic control unit 102 may classify the person as a person classification. In some embodiments, the electronic control unit 102 may also classify the pedestrian walkway 210 as a pedestrian walkway classification (or the like). Based on detecting the person classification (and/or the pedestrian walkway classification), the electronic control unit 102 determines a notification magnitude level based on the classification of the detected object (e.g., a person classification and/or a pedestrian walkway classification). Hence when a notification is output by a notification device 152, the electronic control unit 102 can output the notification with the notification device 152 at the determined magnitude level. In this case, because a person 200 has been detected and classified as a person classification, the notification magnitude level may be a reduced notification magnitude level as compare to when another object is detected or when no object is detected. For example, if a vehicle horn were to be the particular notification device 152, a volume of the vehicle horn may be reduced. In some embodiments, a different sound may be played instead of the vehicle horn (e.g., different sound snippets, a simulated voice notification, or the like). In yet further embodiments a different type of notification may take the place of the requested notification, such as flashing the vehicle headlamps may be displayed instead of beeping the vehicle horn.

Figure 7:
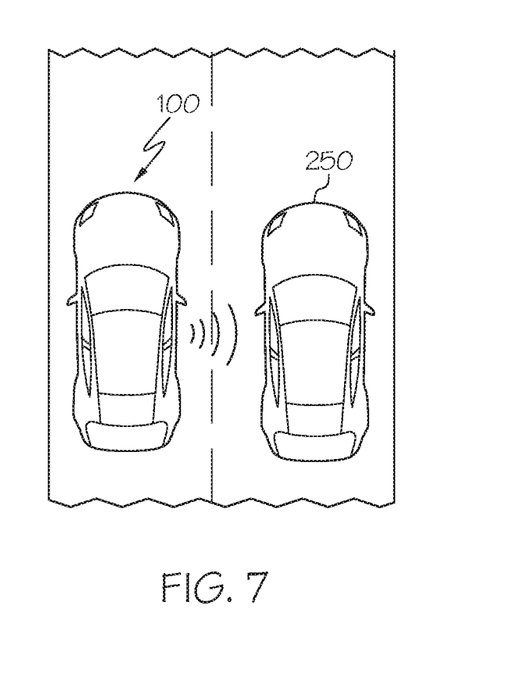
FIG. 7 depicts the vehicle of FIG. 1 within an environment with another vehicle, according to one or more embodiments shown and described herein.

A different environment is illustrated in FIG. 7. The vehicle 100 is driving next to a second vehicle 250. In such an environment, the electronic control unit 102, based on the output signal of the object detection sensor 132 would detect an object (e.g., the second vehicle 250) within the vicinity of the vehicle 100. The electronic control unit 102 may execute object recognition logic to classify the object. In this case, the electronic control unit 102 may classify the second vehicle 250 as a vehicle classification. Based on detecting the vehicle classification, the electronic control unit 102 determines a notification magnitude level based on the classification of the detected object (e.g., a vehicle classification). Hence when a notification is output by a notification device 152, the electronic control unit 102 can output the notification with the notification device 152 at the determined magnitude level. In this case, because a second vehicle 250 has been detected and classified as a vehicle classification, the notification magnitude level may be a regular (i.e. a typical magnitude level) or even enhanced (e.g. a more intense) notification magnitude level as compared to when a different classification of object is detected.

For example, if a vehicle horn were to be the particular notification device 152, a volume of the vehicle horn may be raised. Where the notification device 152 includes the vehicle lights, the brightness of the vehicle lights may be increased.

In some embodiments, the electronic control unit 102 may further be configured to determine a distance of the detected object from the vehicle 100. Such may be accomplished through the use of a proximity sensor. The notification magnitude level may, therefore, further be based on the distance of the detected object from the vehicle 100. For example, objects farther away may merit a larger notification magnitude level than objects which are determined to be closer. For example, and not as a limitation, objects determined to be within a predetermined distance (e.g., about 100 feet) may be considered sufficiently close to indicate an environment that merits a lower notification magnitude level. However, objects determined to be outside of a predetermined distance may be considered sufficiently far to indicate an environment that merits a higher notification magnitude level.

The electronic control unit 102 may, based on the output signal of the object detection sensor 132, detect a plurality of objects within the environment of the vehicle 100. The electronic control unit 102 may then determine a number of the plurality of objects. The electronic control unit 102 may determine a notification magnitude based, at least in part, on the number of objects detected within the environment of the vehicle 100. For example, a higher number of detected objects (e.g. 20 or more) within the environment of the vehicle 100 may indicate to the electronic control unit 102 that the environment of the vehicle 100 merits a lower notification magnitude level. A lower number of detected objects (e.g., less than 20) within the environment of the vehicle 100 may indicate to the electronic control unit 102 that the environment of the vehicle 100 merits a higher notification magnitude. In some embodiments, the opposite may hold true.

The electronic control unit 102 may receive or generate a request to output a notification from the notification device 152. For example, the user may request to output a notification my pressing the center of the steering wheel of the vehicle 100 to operate the vehicle horn, toggling a light toggle to flash the vehicle headlamps, or the like. As noted above, the request to output a notification may be automatically generated by the electronic control unit 102. For example, the electronic control unit 102 may recognize a situation and may automatically output a vehicle presence notification. For example, electric vehicles are often very quiet. It may be desirable to automatically generate a vehicle presence notification to warn pedestrians, cyclists, animals, and the like of the presence of the vehicle 100. Such notifications may include a variety of noises or visual cues such as, for example, a simulated engine noise, a simulated flywheel noise, a simulated voice warnings. The vehicle presence notification may be automatically made when a vehicle operator steps on the gas pedal or at some other predetermined time.

In some embodiments, the vehicle 100 may output a vehicle presence notification automatically in response to detecting a person or animal. For example, in embodiments including object recognition sensors, the electronic control unit 102 may execute object recognition logic to classify the objects found within the environment of the vehicle 100. For example, where the electronic control unit 102 determines a person classification (e.g., a person, cyclist, or they like) is present within the environment of the vehicle 100, the electronic control unit 102 may output a vehicle presence notification to warn the object of the presence of the vehicle 100. As another example, the vehicle 100 might not even be moving when outputting a vehicle presence notification. For example, the electronic control unit 102 may output a vehicle presence notification in response to detecting a person classification (e.g. a cyclist) near the vehicle 100 when a vehicle door is opening. Such notification might warn both the vehicle user of the presence of the person classification and the detected object of the presence of the vehicle 100. When the electronic control unit 102 receives or generates a request to output the notification (e.g., based on an input by the user or an automatically generated alert), the electronic control unit 102 may output the notification with the notification device 152 at the determined notification magnitude level in response to the request to output the notification (block 28).

In some embodiments, an object within the environment of the vehicle 100 is detected by the object detection sensor 132 in response to the request to output the notification. Hence when a request is received and/or generated to output a notification with the notification device 152, the electronic control unit 102 may then detect the object(s) within the environment and classify the detected object(s) into the classification in response to the request to output the notification. Hence the notification magnitude level may be determined in response to the request to output the notification. Is other embodiments, the electronic control unit 102 may be constantly or periodically adjusting the notification magnitude level of the notification device 152 in preparation for receiving and/or generating a request to output the notification with the notification device 152.

As noted above, in some embodiments, the electronic control unit 102 is also configured to determine a notification type based on the classification of the detected object and to output the notification of the notification type with the notification device 152. For example, the electronic control unit 102 may output a notification deemed appropriate based on the environment of the vehicle 100. For example, instead of beeping a vehicle horn in a residential neighborhood, the electronic control unit 102 may instead flash the vehicle headlamps in response to the request for to output a notification. Furthermore, in some embodiments, the electronic control unit 102 is also configured to determine a notification type based on the time of day. In some embodiments, the electronic control unit 102 is configured to determine a notification type based on the environment of the vehicle 100 and the time of day. For example, when the time of day is daytime and the environment of the vehicle 100 is a residential neighborhood, the notification type may be a vehicle horn, while when the time of day is nighttime and the environment of the vehicle 100 is a residential neighborhood, the notification may type may by flashing the vehicle headlights.

In some embodiments, the electronic control unit 102 is configured to determine a vehicle operating condition and determine the notification magnitude level based on the vehicle operating condition. As noted herein the vehicle 100 may include a vehicle operating condition sensor system 160 that includes an operation condition sensor 162 configured to output an output signal indicative of the operation of the vehicle 100.

For example, where the operation condition sensor 162 includes a speed sensor, the vehicle operating condition is the speed of the vehicle 100. The speed of the vehicle 100 may be indicative of an environment which may merit higher or lower notification magnitude levels. In some embodiments, the notification magnitude level may include a first magnitude level when the speed of the vehicle 100 is a first speed and a second magnitude level when the speed of the vehicle 100 is a second speed. Where the first speed is less than the second speed, the first magnitude level may be less than the second magnitude level. For example, if the vehicle 100 is traveling at about 40 mph or below (such as in an urban or residential setting) the electronic control unit 102 may determine that the environment of a vehicle merits a lower notification level. Conversely, if the vehicle 100 is traveling above about 40 mph (such as in a highway or rural setting) the electronic control unit 102 may determine that the environment of the vehicle 100 merits a higher notification level. In some embodiments, the notification magnitude level may gradually increase with increasing speed.

It should now be understood that the embodiments disclosed herein include vehicles configured to adjust the vehicle's warnings and alerts depending on an environment of the vehicle. Using information received from various sensors as described herein, the vehicle may provide context dependent warnings and alerts. Hence depending on environmental and or operation conditions of the vehicle, a notification magnitude level of a notification device may be adjusted.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    an object detection sensor configured to output an output signal;
    a notification device; and
    a electronic control unit configured to:
        detect an object based on the output signal of the object detection sensor;
        classify the detected object into a classification;
        determine a notification magnitude level based on the classification of the detected object; and
        output a notification with the notification device at the determined notification magnitude level.

2. The vehicle of claim 1, wherein:
    the notification magnitude level is a first magnitude level when the classification is a first classification;
    the notification magnitude level is a second magnitude level when the classification is a second classification; and
    the first magnitude level is lower than the second magnitude level.

3. The vehicle of claim 2, wherein the first classification is a person classification and the second classification is a vehicle classification.

4. The vehicle of claim 1, wherein the electronic control unit is configured to:
    determine a distance of the detected object from the vehicle; and
    determine the notification magnitude level based on the distance of the detected object from the vehicle.

5. The vehicle of claim 1, wherein the electronic control unit is configured to:
    detect a plurality of objects based on the output signal of the object detection sensor;
    determine a number of objects of the plurality of objects; and
    determine the notification magnitude level based on the number of objects.

6. The vehicle of claim 1, wherein the electronic control unit is configured to:
    receive a request to output the notification; and
    output the notification with the notification device at the determined notification magnitude level in response to the request to output the notification.

7. The vehicle of claim 6, wherein the electronic control unit is configured to:
    detect the object in response to the request to output the notification;
    classify the detected object into the classification in response to the request to output the notification; and
    determine the notification magnitude level in response to the request to output the notification.

8. The vehicle of claim 1, wherein the electronic control unit is configured to:
    determine a notification type based on the classification of the detected object; and
    output the notification of the notification type with the notification device.

9. The vehicle of claim 1, wherein the electronic control unit is configured to output a vehicle presence notification when the classification is a person classification.

10. The vehicle of claim 1, wherein the electronic control nit is configured to:
    deter mine a vehicle operating condition; and
    determine the notification magnitude level based on the vehicle operating condition.

11. The vehicle of claim 10, wherein:
    the vehicle operating condition is a speed of the vehicle;
    the notification magnitude level is a first magnitude level when the speed of the vehicle is a first speed;
    the notification magnitude level is a second magnitude level when the speed of the vehicle is a second speed;
    the first speed is less than the second speed; and
    the first magnitude level is less than the second magnitude level.

12. A vehicle comprising:
    a location sensor configured to output an output signal;
    a notification device; and
    an electronic control unit configured to:
        determine a vehicle location based on the output signal of the location sensor;
        determine a notification magnitude level based on the determined vehicle location; and
        output a notification with the notification device at the determined notification magnitude level.

13. The vehicle of claim 12, wherein:
    the notification magnitude level is a first magnitude level when the vehicle location is a first vehicle location;
    the notification magnitude level is a second magnitude level when the vehicle location is a second vehicle location; and
    the first magnitude level is lower than the second magnitude level.

14. The vehicle of claim 13, wherein the first vehicle location is an urban vehicle location and the second vehicle location is a rural vehicle location.

15. The vehicle of claim 12, wherein the electronic control unit is configured to:
   determine a notification type based on the determined vehicle location; and
   output the notification of the notification type with the notification device.

16. The vehicle of claim 12, further comprising an object detection sensor, wherein the electronic control unit is configured to:
   detect an object based on the output signal of the object detection sensor;
   classify the detected object into a classification; and
   output a vehicle presence notification when the classification is a person classification.

17. The vehicle of claim 12, wherein the electronic control unit is configured to:
   determine a vehicle operating condition; and
   determine the notification magnitude level based on the vehicle operating condition.

18. The vehicle of claim 17, wherein:
   the vehicle operating condition is a speed of the vehicle;
   the notification magnitude level is a first magnitude level when the speed of the vehicle is a first speed;
   the notification magnitude level is a second magnitude level when the speed of the vehicle is a second speed;
   the first speed is less than the second speed; and
   the first magnitude level is less than the second magnitude level.

19. A vehicle comprising:
   a sensor configured to output an output signal;
   a vehicle horn; and
   an electronic control unit configured to:
      determine, based on the output signal of the sensor, at least one of a classification of a detected object and a vehicle location;
      determine a notification magnitude level based on the at least one of the classification of the detected object and the vehicle location; and
      output an audible notification with the vehicle horn at the determined notification magnitude level.

20. The vehicle of claim 19, wherein the sensor includes at least one of an object detection sensor and a location sensor.

* * * * *

UNITED STATES PATENT AND TRADEMARK OFFICE
CERTIFICATE OF CORRECTION

| | | |
|---|---|---|
| PATENT NO. | : 10,569,708 B2 | Page 1 of 1 |
| APPLICATION NO. | : 15/624431 | |
| DATED | : February 25, 2020 | |
| INVENTOR(S) | : Todd J. Rowell | |

It is certified that error appears in the above-identified patent and that said Letters Patent is hereby corrected as shown below:

In the Claims

In Column 12, Line(s) 37, delete "nit" and insert --unit--, therefor.

Signed and Sealed this
Eleventh Day of August, 2020

Andrei Iancu
*Director of the United States Patent and Trademark Office*